A. LUPTON.
Cultivator.

No. 232,993. Patented Oct. 5, 1880.

WITNESSES:
A. Schehl.
C. Sedgwick.

INVENTOR:
A. Lupton
BY Munn & Co
ATTORNEYS.

United States Patent Office.

ADDISON LUPTON, OF TROY GROVE, ASSIGNOR TO HIMSELF, MYRON A. HOLBROOK, MATTHEW BUHLER, AND OLIVER CHADDOCK, OF LAMOILLE, ILL.

CULTIVATOR.

SPECIFICATION forming part of Letters Patent No. 232,993, dated October 5, 1880.

Application filed February 18, 1880.

*To all whom it may concern:*

Be it known that I, ADDISON LUPTON, of Troy Grove, in the county of La Salle and State of Illinois, have invented a new and useful Improvement in Cultivators, of which the following is a specification.

Figure 1:
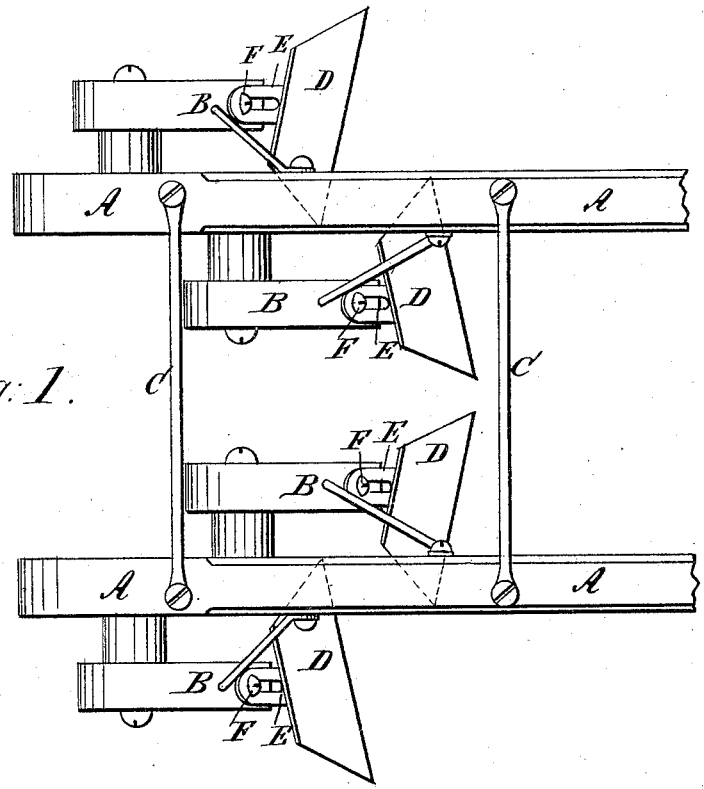
Figure 2:
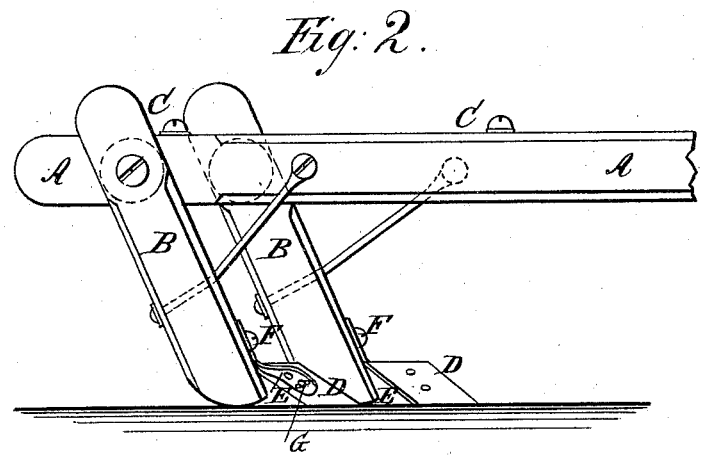
Figure 3:
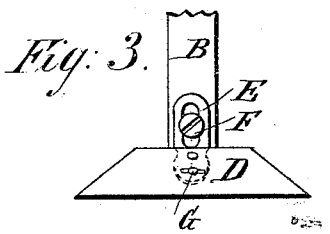

Figure 1 is a plan view of the improvement. Fig. 2 is a side elevation. Fig. 3 is a front elevation of one of the plow-plates.

Similar letters of reference indicate corresponding parts.

The object of this invention is to enable plants to be cultivated when small without covering them with clods or soil, and when larger without cutting off or injuring the roots of the plants.

The invention consists in combining with a cultivator-frame means whereby both sides of a row of plants may be scraped or filled at the same time, as hereinafter described.

A are the beams, B are the standards, and C are the connecting cross-bars, of the cultivator-frame, about the construction of which parts there is nothing new.

D are the plow-plates, which are made long with inclined or beveled ends and straight lower or cutting edges. To the rear sides of the middle parts of the plow-plates D are attached the lower ends of the shanks E, the upper parts of which are slotted longitudinally to receive the screws or bolts F, that secure them to the lower ends of the standards B, so that by loosening the clamp-screws F the plates may be turned, adjusted as to their throw, and again fastened with the screw-clamps. The lower ends of the shanks E have transverse slots formed in them to receive the fastening-bolts G.

With this construction by loosening the bolts F G the plow-plates D may be adjusted as required.

The shanks E are made with a twist to give the plow-plates D an inclination, as shown in the drawings. The outer plow-plates D are secured to the standards B, with their inner ends inclined to the rearward, as shown in Fig. 1.

When the cultivator is to be used for cultivating small plants the inner plow-plates D are adjusted with their inner ends inclined forward and near together, space being left between them for the passage of the plants. With this adjustment the inner plow-plates D will cut the grass and weeds close to the plants, and will move the cut grass and weeds and all lumps and clods away from the plants, so that the plants will not be covered or injured. When the plants are larger the inner plow-plates D are exchanged, which gives their inner ends a rearward inclination to throw the soil around the plants, and thus hill them. The outer plows D remain unchanged, and are designed to cut the grass and weeds and loosen the soil in the middle part of the space between the rows of plants and assist in hilling the plants.

Having thus described my invention, I claim as new and desire to secure by Letters Patent—

The combination, with the frame A B C, of the plates D, acute-angled at each end, and provided with shanks E, twisted to incline them, the two outside plates being inwardly inclined and the inside plates being adjustable to incline either inwardly or outwardly, whereby both sides of a row of plants may be scraped or hilled, as described.

ADDISON LUPTON.

Witnesses:
F. L. ANGIER,
WILLIAM BROWN.